United States Patent
Mosiondz

[19]

[11] Patent Number: 5,890,522
[45] Date of Patent: Apr. 6, 1999

[54] TREE DELIMBING APPARATUS

[76] Inventor: Gary Mosiondz, 31 Jowasson Dr., Wabowden, Manitoba, Canada, R0B 1S0

[21] Appl. No.: 859,723

[22] Filed: May 21, 1997

[51] Int. Cl.[6] .............................. A01G 23/00; B27L 1/00
[52] U.S. Cl. ....................................... 144/24.13; 144/343
[58] Field of Search ................................ 144/24.13, 4.1, 144/343, 208.1

[56] References Cited

U.S. PATENT DOCUMENTS

| | | | |
|---|---|---|---|
| 3,340,912 | 9/1967 | Williams et al. | 144/343 |
| 3,572,410 | 3/1971 | McElderry | 144/4.1 |
| 3,719,217 | 3/1973 | Bottoms | 144/24.13 |
| 3,763,904 | 10/1973 | Eynon | 144/24.13 |
| 4,172,478 | 10/1979 | Dakus | 144/343 |
| 4,462,438 | 7/1984 | Gaudreault | 144/24.13 |
| 4,898,218 | 2/1990 | Linderholm | 144/24.13 |
| 4,898,221 | 2/1990 | Eriksson . | |
| 4,913,203 | 4/1990 | Lessard | 144/34.1 |
| 4,981,163 | 1/1991 | Westlund | 144/4.1 |
| 5,129,438 | 7/1992 | Hamilton | 144/343 |
| 5,148,843 | 9/1992 | Côté | 144/24.13 |
| 5,293,914 | 3/1994 | Hudson | 144/24.13 |
| 5,318,081 | 6/1994 | Parkhurst | 144/24.13 |
| 5,355,920 | 10/1994 | Tanguay | 144/338 |

*Primary Examiner*—W. Donald Bray
*Attorney, Agent, or Firm*—Ridout & Maybee

[57] ABSTRACT

A delimber suitable for mounting on a logging skidder. The delimber comprises a series of delimbing/clamping elements and hydraulic actuators for moving the delimbing/clamping elements between an open and a closed position. Each of the delimbing elements comprises a clamping surface and a cutting edge. In the closed position, the delimbing elements hold a bunch of trees and the cutting edges penetrate the trees. Moving the delimber along the trees causes the cutting edges to cut the limbs off the trunks. In another aspect, the delimber includes a tilt feature for topping the trees.

10 Claims, 5 Drawing Sheets

TREE DELIMBING APPARATUS

FIELD OF THE INVENTION

The present invention relates to a delimber apparatus for logging, and more particularly to a multiple head delimber which is mounted on a logging skidder.

BACKGROUND OF THE INVENTION

Delimbing in the logging field comprises removing or cutting off the branches from a felled tree. In the days of old, logging was strictly a manual endeavour and a logger would chop the limbs from a felled tree using a hand axe. The advent of large-scale logging operations has lead to the development of logging machinery to improve the efficiency and output of a logging operation.

In U.S. Pat. No. 4,462,438, Gaudreault discloses a dual head delimber which is mounted to one end of a boom on a logging vehicle. The dual head delimber comprises a cradle having two sets of pivotally mounted clamps which are juxtaposed to one another and mounted at an angle to define a V-shaped arrangement in relation to the longitudinal axis of the boom. The dual head delimber also includes a separate delimbing knife for each clamp. In operation, the operator moves the boom to bring the dual head delimber near a pile of felled trees and the delimber is lowered with the clamps opened around the felled trees. The clamps are then closed to grasp one or more of the felled trees and the boom is retracted so that the butt ends of the trees can also be grasped by another clamping element. The clamps are then slightly loosened and the delimbing knives are brought into contact with the trees, and the boom is moved longitudinally along the trees to delimb the trees. Once delimbed, the first clamps are engaged, while the second clamps are disengaged, and the boom is moved to unload the delimbed trees.

While the dual head delimber taught by Gaudreault provides a means for delimbing trees, there are shortcomings. First, the arrangement of the dual head delimber and boom requires a vehicle with an adequate flat-bed to accommodate the boom and the clamp elements for clamping the butt ends of the trees. Secondly, the felled trees cannot be delimbed as they lay on the ground. The trees must be gathered into a bundle and loaded on the vehicle with the delimber as taught by Gaudreault. In practical terms, this means that such a vehicle will only be suitable for roadside delimbing operations and not in the field. In another aspect, the arrangement of the clamping elements and delimbing knives limits the effectiveness of the dual head delimber, and also the number of trees which can be delimbed at one time.

The present invention addresses these shortcomings by providing a multiple-head delimber apparatus suitable for mounting on a grapple skidder or line skidder, which allows a bundle of felled trees to be delimbed on the ground without the need to move or lift the trees off the ground.

BRIEF SUMMARY OF THE INVENTION

The present invention provides a multiple-head delimber apparatus comprising a series of delimbing/clamping elements. The delimber apparatus includes hydraulic or pneumatic actuators for opening and closing the delimbing/clamping elements. Each of the delimbing/clamping elements includes integrated blade members. According to the invention, the delimbing/clamping elements and blade members are curved to cut the limbs from around the trunk of the tree including the underside.

The multiple-head delimber is adapted for mounting on a grapple skidder, line skidder, or other suitable logging vehicle, and for operation on-site at the logging lot. The delimber is suitable for delimbing trees as they lay on the ground at a logging site.

In another aspect, the hydraulic actuators provide the capability to press the blades into the bark of the felled tree in order to efficiently cut the branches as the skidder is moved along the length of the felled trees.

The delimber apparatus according to the invention also includes a hydraulic or pneumatic actuated tilt movement. The tilt feature allows the felled trees to be topped by simply engaging the delimbing blades and tilting the delimber to snap-off the top of the trees with the delimber blades engaged.

In a first aspect, the present invention provides a delimber apparatus suitable for mounting on a logging vehicle, said delimber apparatus comprising: (a) a frame member having mounts for connecting to the vehicle; (b) a plurality of delimbing elements, said delimbing elements being movably coupled to said frame member; (c) actuators coupled to each of said delimbing elements for moving said delimbing elements between a closed position and an open position; and (d) each of said delimbing elements having a clamping portion for clamping one or more trees and a cutting edge for cutting limbs from the trees.

BRIEF DESCRIPTION OF THE DRAWINGS

Reference will now be made to the accompanying drawings which show, by way of example, a preferred embodiment of the present invention, and in which:

FIG. 2(*b*) is a top view of the delimber apparatus showing the arrangement of the delimber blades, link arms, and hydraulic cylinders;

FIG. 3(*b*) is a front view of the delimber apparatus of FIG. 2(*a*) with the delimber blades in an opened position;

FIG. 5(*b*) is a front view of the frame for the delimber apparatus;

DETAILED DESCRIPTION OF THE PREFERRED EMBODIMENT

Figure 1:
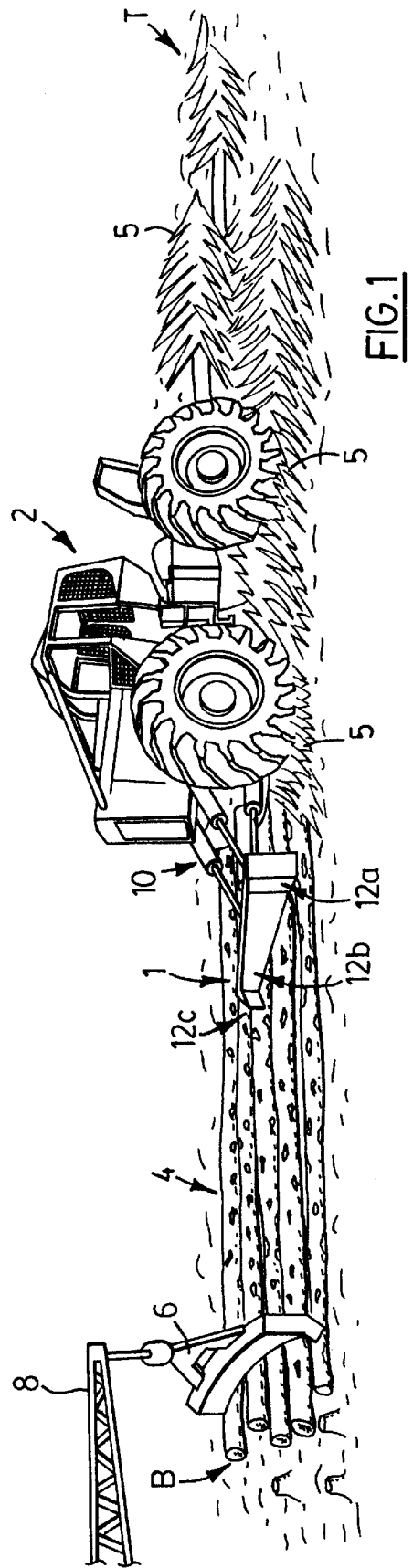
FIG. 1 is a diagrammatic view of a delimber apparatus according to the present invention mounted on a logging skidder.

Reference is first made to FIG. 1, which shows in diagrammatic form a delimber apparatus 1 according to the present invention. In FIGS. 1 to 7, like references indicate like elements.

As shown in FIG. 1, the delimber apparatus 1 is mounted on a logging vehicle or tractor 2, for example a skidder of known design. It is a feature of the present invention that the delimber apparatus 1 may be mounted on a wide variety of logging vehicles thereby providing the capability for delimbing a bundle of trees at a logging site instead from a roadside location to where the felled trees must be first be transported. In FIG. 1, the felled trees, indicated generally by 4, are delimbed as they lay on the ground. The felled trees 4 are held by their butt ends B by a grappler 6 of known design. The grappler 6 is attached to a movable boom 8 mounted on a suitable vehicle (not shown), for example, another skidder. The skidder 2 with the delimber 1 straddles the bundle of trees 4 and moves forward to the grappler 6. The operator engages the bundle of trees 4 with the delimber 1 and moves back and forth over the trees 4 to delimb or strip the branches 5.

As will be described, the delimber 1 includes hydraulic actuators to adjust the attitude of the delimber 1 and maintain full contact with the trees 4. This feature is particularly useful because the felled trees 4 are often strewn on uneven ground. The delimber 1 also includes a tilt feature so that the trees 4 can be topped, i.e. the tops T of the trees 4 removed.

As shown in FIG. 1, the delimber apparatus 1 is coupled to the skidder 2 and includes hydraulic lift, tilt and steering actuators denoted generally by 10 for controlling the position and attitude of the delimber 1. The hydraulic actuators 10 allow the attitude of the delimber 1 to be adjusted to maintain full contact with the bundle of the trees 4 on even ground. As shown in FIGS. 1 and 3, the delimber 1 comprises a centre portion 12b and respective end portions 12a, 12c which are inclined downwards. The downward attitude of the end portions 12a, 12c allows the delimber 1 to embrace the trees 4 and delimb the sides of the bundle 4.

Reference is next made to FIGS. 2 to 5 which show the delimber 1 according to the present invention in more detail. The delimber 1 comprises a main frame 14 and two rows 16, 18 of blade members 20. As shown in FIG. 2(a), the blade members 20 for the first row 16 are shown individually as 20a, 20b, 20c and 20d. The blade members 20 for the second row are shown individually as 20e, 20f, 20g and 20h.

Figure 3A:
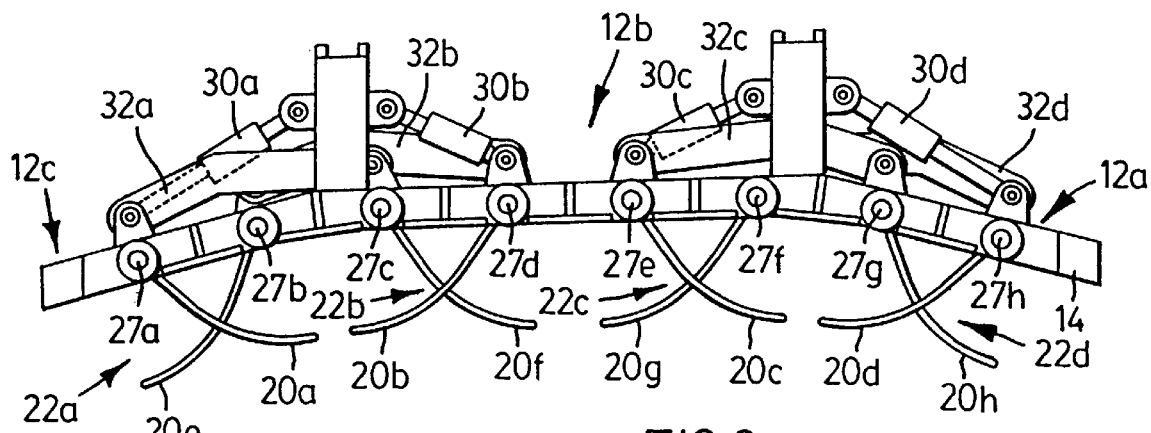
FIG. 3(*a*) is a front view of the delimber apparatus of FIG. 2 (*a*) with the delimber blades in a closed position.
Figure 3B:
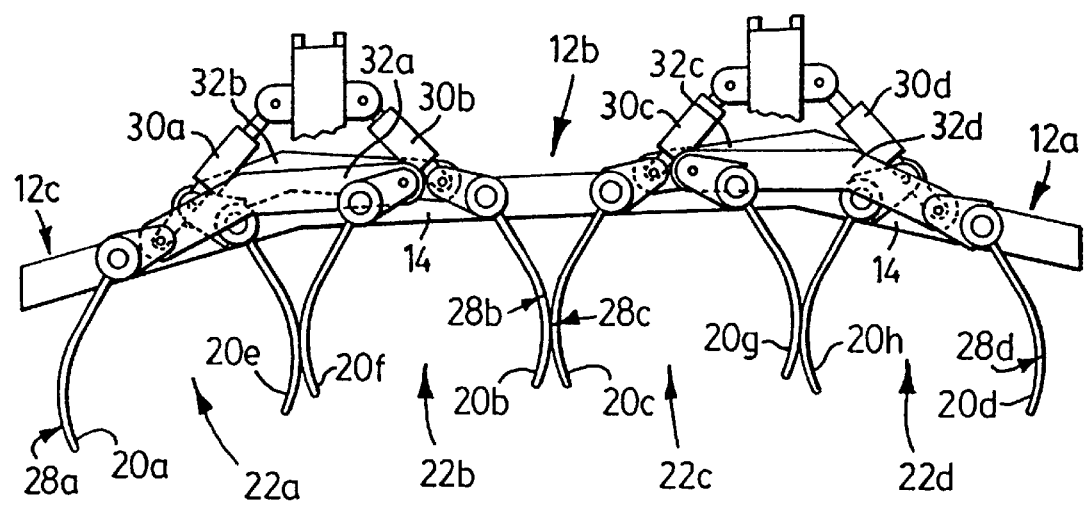

As shown in FIG. 3, the blade members 20 are grouped into four delimbing/clamping elements 22a, 22b, 22c, 22d. Each delimbing/clamping element 22 comprises one blade member 20 from the first row 16 and one blade member 20 from the second row 18. For example, the delimbing/clamping element 22a comprises blade members 20a and 20e. In FIG. 3(a), the delimbing elements 22 are in a closed position, and in FIG. 3(b), the delimbing elements 22 are in an open position. The delimbing/clamping elements 22 are moved between the open and closed positions by hydraulic (or pneumatic actuators) as described below. The hydraulic actuated delimbing elements 22 provide the capability to gather and hold the bundle of trees 4 at the same time the blade members 20 cut the limbs.

Figure 5A:
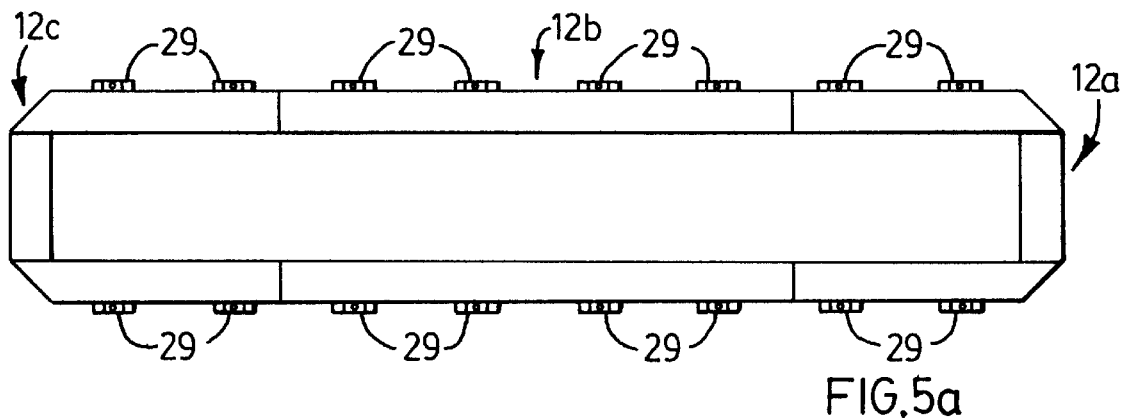
FIG. 5(*a*) is a top view of the frame for the delimber apparatus.
Figure 5B:
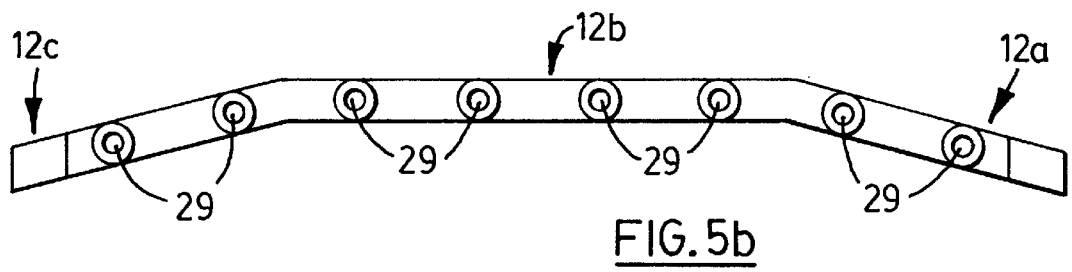
Figure 7:
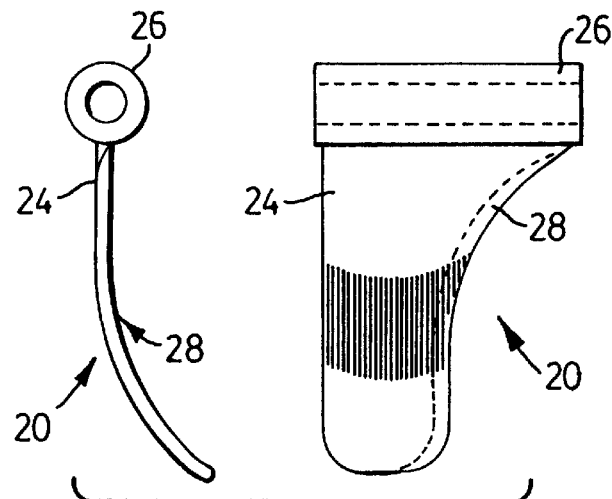
FIG. 7 is a front and a side view of the delimber blade.

As shown FIG. 7, each blade member 20 comprises a planar blade 24 and a mounting shoulder 26. The blade 24 is curved and has a leading cutting edge denoted by 28. The planar blade 24 provides a reinforced cutting surface which can be moved backwards and forwards over the felled trees without being deflected, or damaged by rocks or stumps on the ground. The blade members 20 are preferably made from a high tensile steel such as CHT 100 steel. The planar blade 24 particularly in the inside curved surface provides a clamping surface for grasping the trees 4. The shoulder 26 is bored for receiving a pin or shaft 27 (FIG. 3(a)) and mounting the blade 20 on the frame 14 through corresponding bosses 29 as shown in FIG. 5(b). As also shown in FIG. 5(b), the end portions 12a, 12c of the frame 14 are inclined at approximately 15 degrees from horizontal.

Figure 2A:
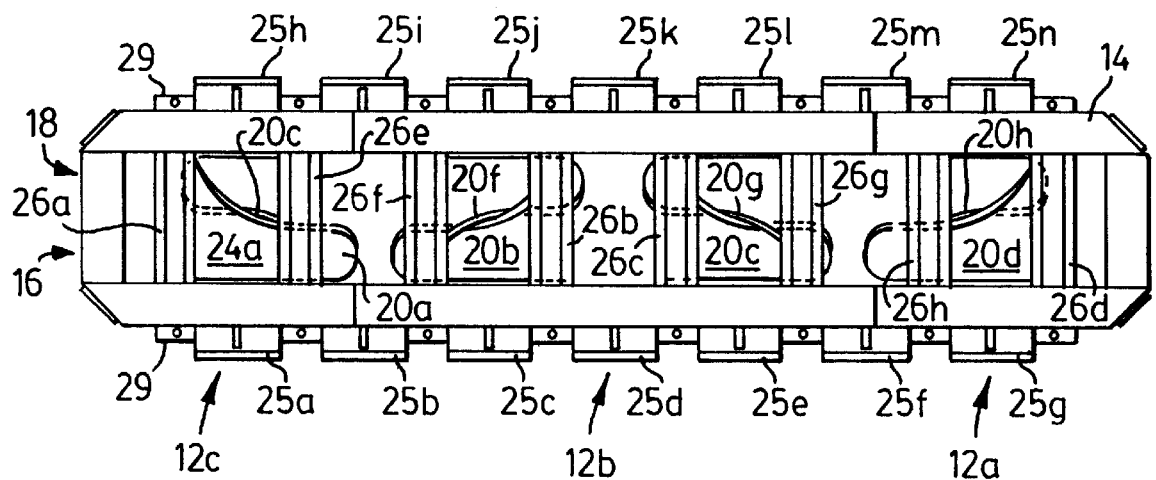
FIG. 2(*a*) is a top view of the delimber apparatus without a cover showing the arrangement of delimber blades.

FIG. 2(a) shows the arrangement of the blade elements 20 in the main frame 14 with the hydraulic cylinders and link arms removed for greater clarity. As also shown in FIG. 2(a), the delimber 1 preferably includes stationary blade members 25. The stationary blade members 25 are mounted on the main frame 14 and denoted individually as 25a, 25b, 25c, . . . and provide an additional cutting surface for delimbing the trees being held in delimbing elements 22. The stationary blade members 25 are also preferably made from a high tensile steel.

Figure 2B:
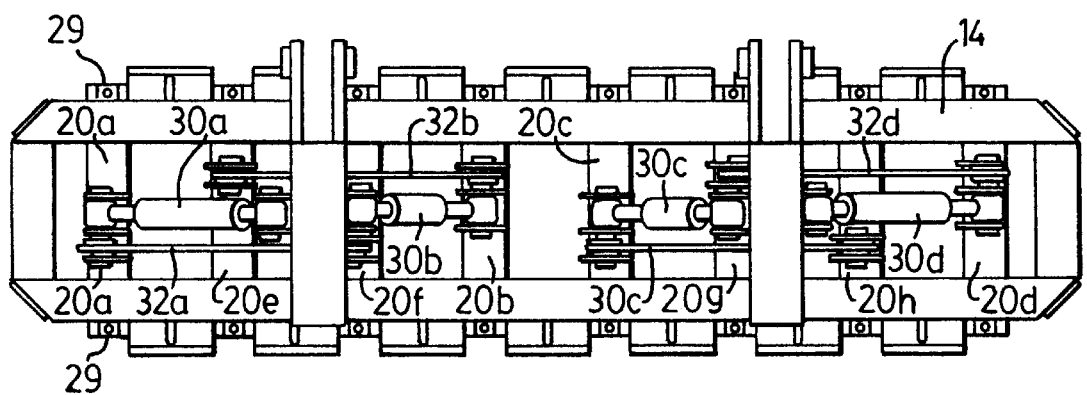

The delimbing/clamping elements 22 are moved between the open and closed positions by a series of hydraulic actuators 30 and link arms 32. Referring to FIG. 2(b), the hydraulic actuators 30 are shown individually as hydraulic cylinder 30a, 30b, 30c, and 30d. The link arms 32 are shown individually as 32a, 32b, 32c and 32d. The first link arm 32a is connected to hydraulic cylinder 30a, and coupled to the blade members 20a and 20f. The second link arm 32b is connected to hydraulic cylinder 30b, and coupled to the blade members 20b and 20e. The third link arm 32c is connected to hydraulic cylinder 30c, and coupled to the blade members 20c and 20h. The fourth link arm 32d is connected to the hydraulic cylinder 30d, and coupled to the blade members 20d and 20g.

In FIG. 2(b), the linkage between the hydraulic cylinders 30, the link arms 32 and the blade members 20 is shown. According to this aspect of the invention, the delimbing/clamping elements 22 comprise blade members 20 connected to separate link arms 32. For example, delimbing element 22a comprises blade members 20a, 20e, with blade 20a being connected to link arm 32a, and blade 20e being connected to link arm 32b.

Figure 6:
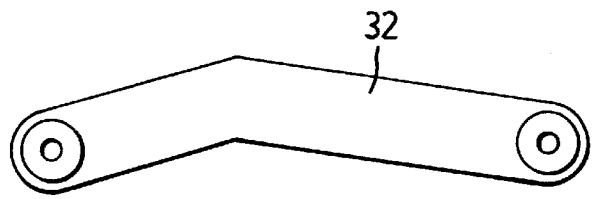
FIG. 6 is a front view of the link arm for the delimber apparatus.

As shown in FIG. 6, the link arm 32 is asymmetrical. By utilizing separate asymmetrical link arms 32 to couple blade members 20 for each delimbing element 22, the opening and closing of the delimbing elements 22 is achieved with an abbreviated travel length for the link arms 32. This arrangement has the advantage of keeping the moving link arms 32 above the main frame 14 and away from tree limbs and possible damage. The operation of the hydraulic cylinders 30 to synchronize the opening and closing of the delimbing elements 22 is controlled by a hydraulic control system which is described below with reference to FIG. 4.

Figure 4:
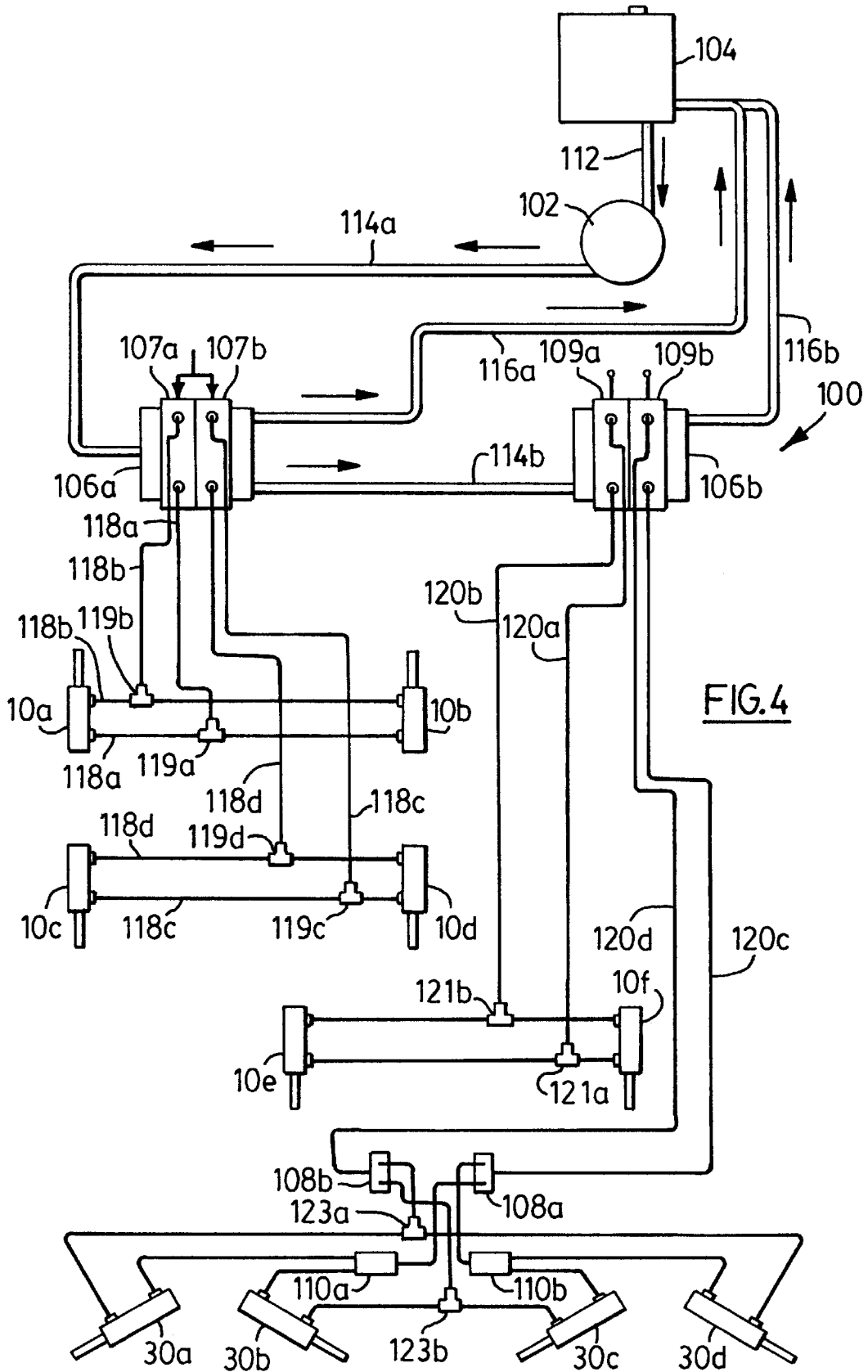
FIG. 4 is a schematic view of a hydraulic system for the delimber apparatus of FIG. 1.

Reference is next made to FIG. 4 which shows in schematic form a hydraulic control system 100 for the delimber 1. The hydraulic system 100 comprises a pump 102, a reservoir 104, hydraulic valve banks 106, flow dividers 108, and synchronizing valves 110. The reservoir 104 comprises a tank which holds hydraulic fluid for operating the system 100. The reservoir 104 is coupled to the pump 102 through a suction line 112. The pump 102 pressurizes hydraulic fluid from the tank 104 and outputs the pressurized fluid through a pressure line 114a.

As shown in FIG. 4, the pressure line 114a provides the hydraulic fluid input for the hydraulic valve bank 106a. The hydraulic valve 106a is coupled to the reservoir 104 through a return line 116a. The hydraulic valve bank 106a is coupled to the second hydraulic valve bank 106b through another pressure line 114b. The second valve bank 106b is also coupled to the reservoir 104 through a return line 116b. The hydraulic valves 106a, 106b comprise conventional devices of the type with two spools, one with float.

The first hydraulic valve bank 106a is coupled to hydraulic actuators 10a, 10b for the controlling the lift of the delimber 1, and hydraulic actuators 10c, 10d for steering control. As shown in FIG. 4, the hydraulic lift cylinders 10a, 10b are coupled to a port 107a on the valve bank 106a through a pressurized line 118a and a return line 118b. The hydraulic fluid flow between the two cylinders 10a, 10b is split by two tee valves 119a, 119b. Similarly, the hydraulic steering cylinders 10c, 10d are coupled to another port 107b on the valve bank 106a through a pressurized line 118c and a return line 118d. The hydraulic fluid flow between the two cylinders 10c, 10d is split by two tee valves 119c and 119d. The hydraulic cylinders 10 are actuated by controlling the flow of hydraulic fluid to the cylinders 10 through the valve bank 106a.

As shown in FIG. 4, the hydraulic cylinders 10e, 10f for controlling the tilt of the delimber 1 are coupled to port 109a on the hydraulic valve bank 106b through a pressurized line 120a and a return line 120b. The hydraulic fluid flow between the tilt cylinders 10e, 10f is split by two tee valves 121a, 121b.

Referring to FIG. 4, the hydraulic cylinders 30 for actuating the delimbing/clamping elements 22 are coupled to port 109b on the hydraulic valve bank 106b through flow dividers 108a, 108b and synchronizing valves 110a, 110b. The first flow divider 108a is coupled to the port 109b on the valve bank 106b through pressurized line 120c. The second flow divider 108b is coupled to the port 109b on the valve bank 106b through return line 120d. The output of the first flow divider 108a is coupled to the synchronizing valves 110a, 110b and together they control the flow of hydraulic fluid to move the blades 20 and synchronize the opening and closing of the clamping elements 22. The second flow divider 108a is coupled to the return lines through tee valves 123a, 123 and collects the hydraulic fluid flow between the cylinders 30a to 30d.

The hydraulic cylinders 30 for the delimbing/clamping elements 22 are implemented using conventional hydraulic cylinders specified as follows: 2" Bore, 8" Stroke, 16" Retracted Length and 24" Extended Length. The tilt hydraulic cylinders 10e, 10f are implemented utilizing conventional hydraulic cylinders specified as follows: 2' Bore, 16' Stroke, 24' Retracted Length and 40' Extended Length.

In operation, the skidder 2 with the delimber 1 is moved over a number of trees to be delimbed. The butt ends of the trees are held by a grappler 6 mounted on another skidder. The operator actuates the hydraulic cylinders 30 to close the delimbing/clamping elements 22 around the bundle of trees so that the blades 20 penetrate the bark of the trees and grasp the trees. The operator then moves the skidder 2 towards the grappler 6 and the leading edge of the first row 16 of blades 20 and the stationary blades 25 cut the limbs from the trees. After the forward pass to the grappler 6, the operator reverses the skidder 2 and moves back to the tops of the trees so that the second row 18 of blades (and the stationary blades 25) cut the limbs from the trees. At the top of the trees, the delimber 1 can be tilted to snap off the tops of the trees, or another forward/backward pass can be made. The arrangement of the delimbing elements 22a and 22d at the respective ends 12a, 12c of the delimber 1 allows the sides of the trees to be delimbed as the blades 20 move along the length of the trees.

It has been found that the delimber 1 is suitable for delimbing approximately 40 trees at a time having a butt diameter of around 6 inches, and approximately 8 trees at a time having a butt diameter of around 18 inches.

From the foregoing, it will be appreciated that a feature of the delimber 1 according to the present invention that the delimbing blades 20 both hold the felled trees and cut the limbs from the trees. The hydraulic actuation of the delimbing elements 22 allows the blade elements 20 to penetrate into the bark of the trees while the trees are held in the closed position. The capability to open and close the delimbing blades 20 around a number of trees can be used to gather individual felled trees into a bundle. In another aspect, the adaptability of the delimber 1 to most logging vehicles, for example, skidders, provides the capability to delimb trees "on-site" with the need to the move the trees to a road-side location where much larger and heavier conventional delimbers would be situated. In another aspect, the hydraulic cylinders 10e, 10f allow the delimber 1 to be tilted on an angle in order to top the trees which are being held by the delimbing/clamping elements 22.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A delimber apparatus suitable for mounting on a logging vehicle, said delimber apparatus comprising:

(a) a frame member having mounts for connecting to the vehicle;

(b) a plurality of delimbing elements, said delimbing elements being movably coupled to said frame member;

(c) actuators coupled to each of said delimbing elements for operatively moving said delimbing elements between a closed position and an open position; and (d) each of said delimbing elements having a clamping portion for clamping one or more trees and a cutting edge for cutting limbs from the trees.

2. The delimber apparatus as claimed in claim 1, wherein each of said delimbing elements comprises first and second members, each of said members comprising a unitary element having a clamping surface and a cutting edge, and said clamping surface reinforcing said associated cutting edge.

3. The delimber apparatus as claimed in claim 2, wherein the cutting edges for said first and second members to provide a forward cutting motion and a backward cutting motion when the delimber is moved along the trees.

4. The delimber as claimed in claim 2, wherein said actuators comprise a plurality of hydraulic cylinders, a hydraulic controller and a plurality of link arms, one of said hydraulic cylinders being connected to each one of said link arms, and for each of said delimbing elements said first and second members being connected to separate link arms, and said hydraulic cylinders and associated link arms being operable under the control of said hydraulic controller to move the first and second members for each of said delimbing elements between the open and closed positions.

5. The delimber apparatus as claimed in claim 4, wherein said hydraulic controller includes flow dividers and synchronizers coupled to said hydraulic cylinders for controlling the actuation of said hydraulic cylinders.

6. The delimber apparatus as claimed in claim 1, further including actuating means for changing the attitude of the delimber, said actuating means being coupled to the logging vehicle.

7. The delimber apparatus as claimed in claim 1, wherein said frame member comprises inclined end portions, and said delimbing elements coupled to said inclined end portions being positioned to cradle a bunch of trees.

8. A delimber apparatus suitable for mounting on a logging vehicle, said delimber apparatus comprising:

(a) a frame member having mounts for connecting to the vehicle;

(b) a plurality of delimbing elements, said delimbing elements being movably coupled to said frame member;

(c) actuators coupled to each of said delimbing elements for moving said delimbing elements between a closed position and an open position;

(d) each of said delimbing elements including first and second members, each of said members comprising a unitary element having a clamping surface for clamping one or more trees and a cutting edge for cutting limbs from the trees, and said clamping surface providing a reinforcing element for said associated cutting edge;

(e) said actuators comprising a plurality of hydraulic cylinders, a hydraulic controller and a plurality of link arms, one of said hydraulic cylinders being connected to each one of said link arms, and for each of said delimbing elements said first and second members being connected to separate link arms, and said hydraulic cylinders being operable under the control of said hydraulic controller to move the associated first and second members between the open and closed positions.

9. The delimber apparatus as claimed in claim 8, wherein the cutting edges for said first and second members are opposed to provide a forward cutting motion and a backward cutting motion.

10. The delimber apparatus as claimed in claim 9, further including a tilting mechanism for changing the attitude of the delimber, said tilting mechanism being coupled to the vehicle and being operable to change the angle of the delimber with respective to the trees being delimbed.

* * * * *